(12) United States Patent
Marketsmueller et al.

(10) Patent No.: US 10,832,412 B2
(45) Date of Patent: Nov. 10, 2020

(54) INTERACTIVE REGION COLORING

(71) Applicant: Adobe Inc., San Jose, CA (US)

(72) Inventors: Sebastian Marketsmueller, San Francisco, CA (US); Till Uro, San Francisco, CA (US); Benoit Gerard Ambry, Fair Oaks, CA (US); Jean-Sylvere Charles Simonet, Rockville, MD (US)

(73) Assignee: Adobe Inc., San Jose, CA (US)

( * ) Notice: Subject to any disclaimer, the term of this patent is extended or adjusted under 35 U.S.C. 154(b) by 196 days.

(21) Appl. No.: 16/007,849

(22) Filed: Jun. 13, 2018

(65) Prior Publication Data
US 2019/0385310 A1 Dec. 19, 2019

(51) Int. Cl.
*G06T 7/11* (2017.01)
*G06T 7/62* (2017.01)
*G06T 11/00* (2006.01)

(52) U.S. Cl.
CPC ............... *G06T 7/11* (2017.01); *G06T 7/62* (2017.01); *G06T 11/001* (2013.01)

(58) Field of Classification Search
None
See application file for complete search history.

(56) References Cited

U.S. PATENT DOCUMENTS

| | | | | |
|---|---|---|---|---|
| 5,596,692 | A * | 1/1997 | Martin | G06F 3/04845 345/443 |
| 6,292,167 | B1 * | 9/2001 | Throup | G06T 11/001 345/589 |
| 8,490,026 | B2 * | 7/2013 | Sareen | G06F 3/04845 715/860 |
| 2007/0188510 | A1 * | 8/2007 | Kokemohr | G06F 3/04845 345/581 |
| 2011/0181618 | A1 * | 7/2011 | DiVerdi | G06F 3/03545 345/620 |
| 2016/0042534 | A1 * | 2/2016 | Tremblay | G06T 11/203 345/586 |
| 2016/0148395 | A1 * | 5/2016 | Kim | G06T 11/001 345/589 |
| 2016/0231833 | A1 * | 8/2016 | Gu | G06F 3/03545 |
| 2016/0342227 | A1 * | 11/2016 | Natzke | G06F 3/03545 |
| 2018/0046268 | A1 * | 2/2018 | Keidar | G06F 3/0383 |
| 2018/0047189 | A1 * | 2/2018 | DiVerdi | G06F 3/04845 |

\* cited by examiner

*Primary Examiner* — David D Davis
(74) *Attorney, Agent, or Firm* — SBMC

(57) ABSTRACT

Interactive region coloring techniques as implemented by a computing device are described to provide a user with the tactile experience of coloring in a region with digital paint, while at the same time allowing the user to manually fill the region with digital paint with more apparent skill and precision than they may input. For each of multiple pixels on the digital medium, the system obtains one or both of a distance value that indicates a distance to a nearby point (e.g., the closest point) on an outline on the digital medium and a direction value that indicates a direction to the nearby point on the outline. A manner in which the digital paint is applied to the region (e.g., forces affecting paint flow, dynamically adjusting brush size or position) is determined based on one or both of the distance value and the direction value.

20 Claims, 12 Drawing Sheets

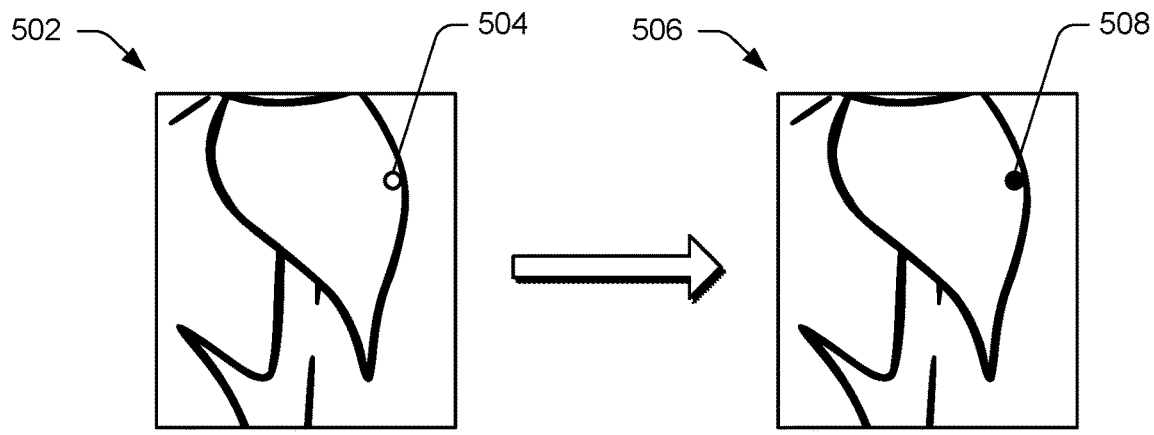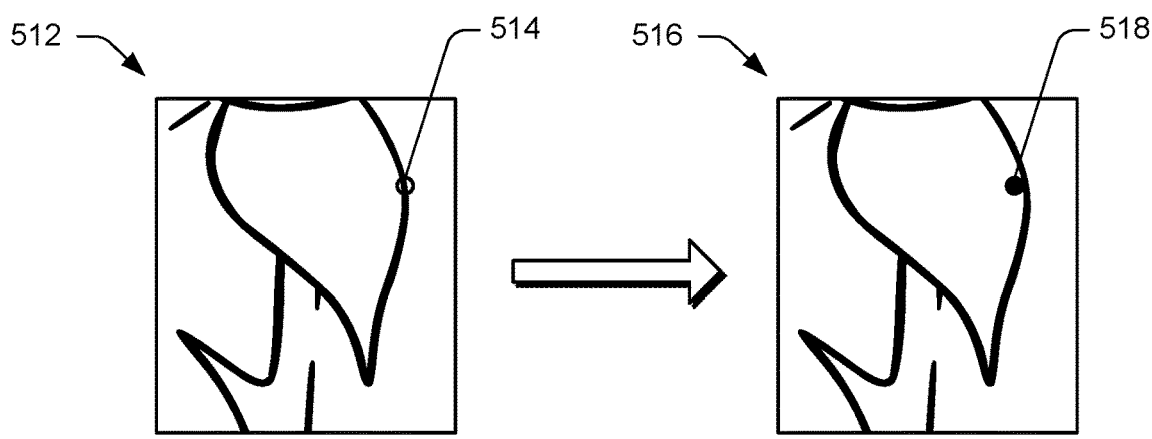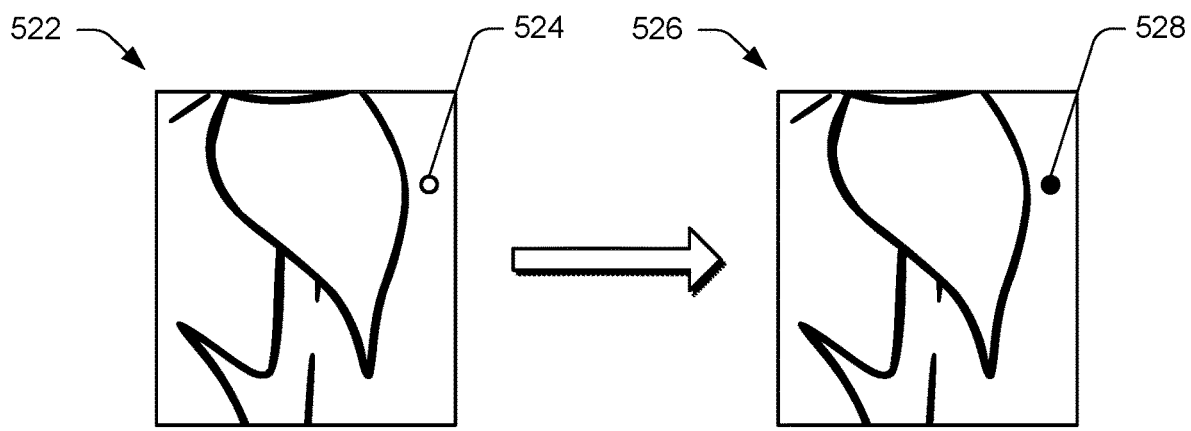
Fig. 5

1100

1102
Receive a user input selecting a location to apply digital paint to a region of a digital medium

1104
Obtain one or both of a direction value identifying a direction from the location towards a nearby point on the outline and a distance value identifying a distance from the location to the nearby point

1106
Determine a manner in which the digital paint is applied to the region based at least in part on one or both of the distance value and the direction value

1108
Dynamically adjust brush size based on distance from the location to the nearby point

1110
Dynamically adjust brush position based on distance from the location to the nearby point

1112
Have the digital paint flow towards the nearby point of the outline

1114
Have the digital paint flow along the outline rather than going over the outline

1116
Have the digital paint flow out from the brush at the user selected location

1118
Display the region with the digital paint applied in the determined manner

Fig. 11

INTERACTIVE REGION COLORING

BACKGROUND

Digital painting applications allow users to generate various works of art by using their computers to apply digital paint to a digital medium such as a digital canvas. These works of art can then be saved, printed, distributed to others, and so forth.

Conventional digital painting applications allow users to select different brushes and colors to paint with. Some conventional digital painting applications allow users to paint over outlines or templates that are on the digital medium as they desire, while other conventional digital painting applications provide a mask layer that prohibits users from applying paint to particular areas. While these techniques are useful, they can require significant skill and precision on the part of the user to create the artistic effect desired by the user, or in some instances even prevent the user from creating the artistic effect he or she desires.

Further, some conventional painting applications include a "paint bucket" tool for rapidly filling an area. Using such a tool, with a single mouse click the user can fill an area with a color of his or her choosing. These tools, however, are typically implemented with a single mouse click and lack any tactile experience of coloring in an area. Furthermore, these tools require areas to be closed in order to be filled. An area that is partially surrounded by a template or outline cannot be filled with such a "paint bucket" tool.

These previous techniques implemented in conventional painting applications resulted in inefficient use and operation of the computing device.

SUMMARY

An interactive region coloring system as implemented by a computing device is described to provide a user with the tactile experience of coloring in a region with digital paint, while at the same time allowing the user to manually fill the region with digital paint with more apparent skill and precision than they may input. In one example, a user input selecting a location to apply digital paint to a region of a digital medium is received, the region being surrounded at least in part by an outline that is a set of one or more lines. One or both of a direction value identifying a direction from the location towards a nearby point on the outline and a distance value identifying a distance from the location to the nearby point is obtained. A manner in which the digital paint is applied to the region is determined based at least in part on one or both of the distance value and the direction value. The region is then displayed with the digital paint applied in the determined manner.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 5 illustrates an example implementation of dynamically adjusting the brush position.

FIG. 11 is a flow diagram depicting a procedure in an example implementation of interactive region coloring.

DETAILED DESCRIPTION

Overview

Figure 1:
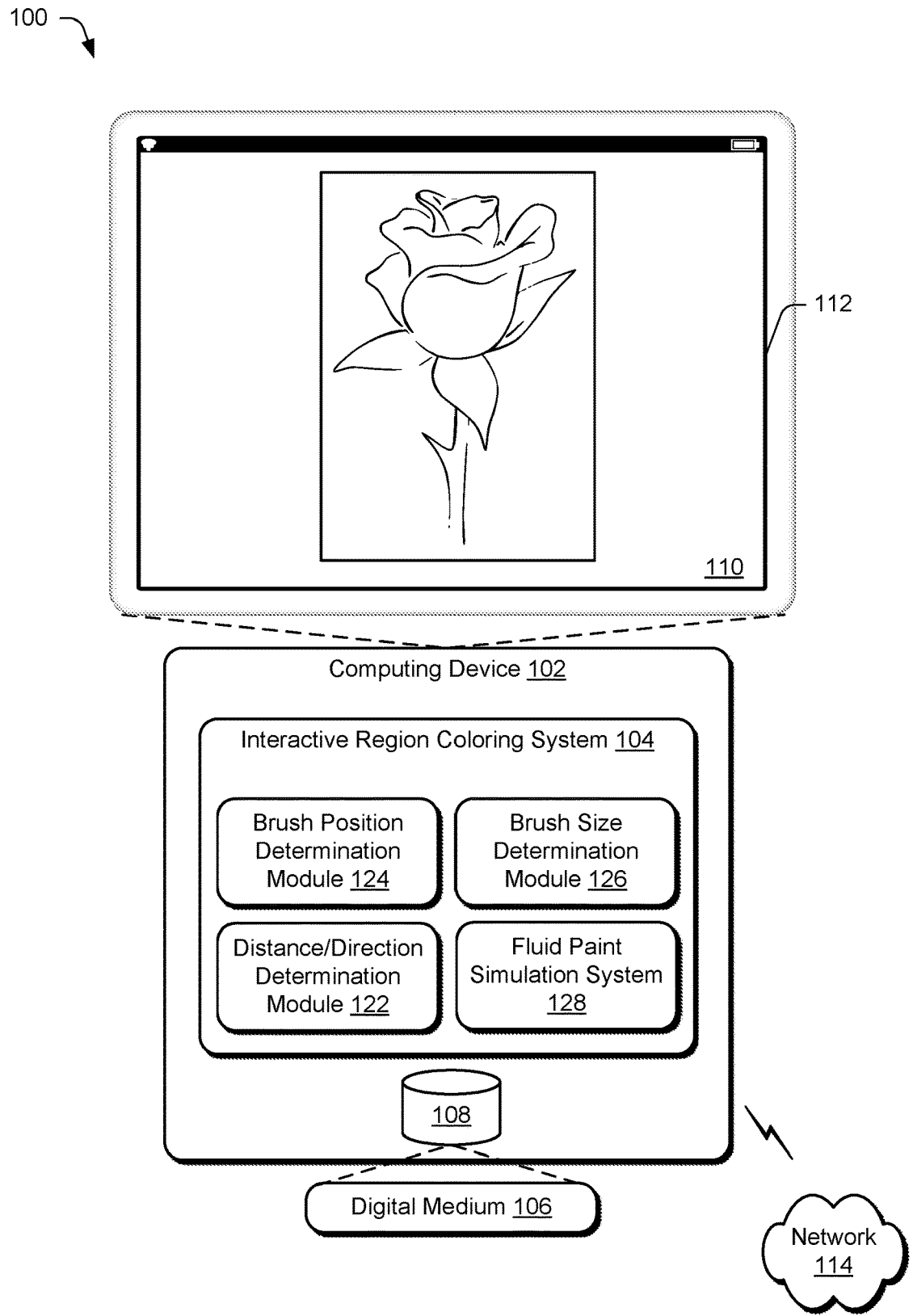
FIG. 1 is an illustration of an environment in an example implementation that is operable to employ interactive region coloring techniques described herein.

Interactive region coloring techniques are discussed herein that provide the user with the tactile experience of coloring in a region with digital paint, while at the same time allowing the user to manually fill the region with digital paint with more apparent skill and precision than they may input. These techniques improve the operation of a computing device by improving the user friendliness of coloring in a region, giving the user the interactive experience of digitally painting the region, including moving a brush over the region being painted, without requiring the region to be fully surrounded by a template or outline in order to be painted.

Conventional digital painting applications allow digital paint to be applied to a digital medium, but can require significant user skill and precision in order for the user to obtain the artistic effect he or she desires. For example, in a situation in which a user is coloring in an outline (e.g., a coloring book scenario in which the user is coloring between the lines) with digital paint and the user desires to stay within the outline, conventional digital painting applications make it difficult for the user to manually fill in areas within the outline and not color beyond the outline. Masks may be used to prevent a user from going over a line (e.g., painting beyond the outline), but this can be problematic if the user desires to go over the line. By way of another example, a user may be provided with the ability to adjust brush parameters via various user preference settings or fields, however, such adjustment is a manual adjustment by the user requiring additional time and knowledge on the part of the user to make the changes. A "paint bucket" tool for rapidly filling an area may also be used, but these tools are typically implemented with a single mouse click and lack any tactile experience of coloring in an area. Furthermore, these tools typically do not work well with simulation based paints and require areas to be closed in order to be filled, so an area that is partially bounded by the outline cannot be filled with such "paint bucket" tools.

With the interactive region coloring techniques discussed herein, digital paint is applied with a brush. The brush is a digital brush, and may or may not be displayed to the user. For example, the user may move a cursor control device to control a digital brush displayed on a display device, or the user may touch a location in the region and his or her finger(s) acts as the digital brush. The interactive region coloring techniques can be implemented in various manners, such as with an interactive region coloring system that can be a standalone digital paint application and/or can be part of an operating system or other program on a computing device.

The interactive region coloring system obtains an outline on a digital medium to which a user will apply digital paint. The outline is a set of one or more lines and can be, for example, a vector outline or binary bitmap. These one or more lines may form one or more enclosed regions (regions that are completely surrounded by one or more lines) as well as unenclosed regions (regions that are partially, but not completely, surrounded by one or more lines). For example, the digital medium can be a page of a digital coloring book, and the outline defines multiple regions of the page that a user can color.

For each of multiple pixels on the digital medium, the interactive region coloring system obtains a distance value that indicates a distance to a nearby point on the outline. The nearby point refers to the point on the outline that is closest to the pixel, or within a threshold distance (e.g. 5 pixels) of the point on the outline that is closest to the pixel. The distance value can optionally be a signed value, with the sign of the distance value indicating whether the pixel is inside or outside the outline. In addition to or in place of the distance value, for each of multiple pixels on the digital medium the interactive region coloring system generates a direction value that indicates a direction to the nearby point (e.g., the closest point) on the outline.

The interactive region coloring system receives a user input selecting a location in a region on a digital medium to apply digital paint to. The digital paint is applied via a brush, which can cover multiple pixels on the digital medium. In response to the user input selecting the location, digital paint is applied to the location, which includes the multiple pixels covered by the brush. The brush can be moved around (e.g., by a user moving his or her finger on a touchscreen, the user moving a mouse or other cursor control device) the region, and as the brush is moved the pixels that are covered by the brush (and to which the digital paint is applied) changes. The brush has a particular brush size that indicates how many pixels the brush covers. Based on the user selected location and one or both of the distance value and the direction value, the manner in which the digital paint is applied to the selected location is determined in order to improve the usability and user friendliness of the interactive region coloring system. This manner in which the digital paint is applied can take one or more of various different forms. Various different manners in which the digital paint is applied are discussed herein, and the interactive region coloring system can apply these manners individually or in any combination.

One example manner in which the digital paint is applied is by dynamically adjusting the brush size so that the farther away the location is from the outline (i.e., the larger the distance value) the bigger the brush is, and the closer the location is to the outline (i.e., the smaller the distance value) the smaller the brush is. This allows the user to quickly fill in portions of the region with a large brush when the selected location is not close to the outline, and allows the user to be more accurate with brush placement as the selected location gets closer to the outline.

Another example manner in which the digital paint is applied is by changing the position of the brush. When the user selected location is close to the outline, the position of the brush is altered as appropriate to not go over the outline. This allows the user to apply digital paint up to, but not go over, the outline. Thus, usability of a device is improved, such as in situations in which a user has difficulty painting right up to the line due to the size of his or her finger that is controlling the brush or difficulty holding his or her finger steady, the digital paint is still applied close to (but not over) the outline.

The interactive region coloring system optionally uses a fluid paint simulation system to determine the manner in which the digital paint is applied. The fluid paint simulation system is a set of fluid mechanics equations that describes how the digital paint moves or flows over the digital medium. Generally, the digital paint is a set of particles in the fluid paint simulation system, and every turn the simulation runs it determines where the particles go and how quickly the particles get absorbed into the digital medium (and when the digital paint is absorbed into the digital medium the digital paint stops moving). Any of a variety of different public and/or proprietary techniques can be used to implement the fluid paint simulation system.

Another example manner in which the digital paint is applied is by having the fluid paint simulation system have the digital paint move towards the nearby point of the outline. This is accomplished by injecting a force component into the fluid paint simulation system based at least in part on the direction value, causing the fluid paint simulation system to flow the digital paint towards the nearby point of the outline. The speed at which the digital paint moves towards the outline can optionally vary based on the distance to the outline, such as moving faster when the location is farther away from the outline (i.e., the larger the distance value), and moving slower when the location is closer to the outline (i.e., the smaller the distance value).

Another example manner in which the digital paint is applied is by having the fluid paint simulation system have the digital paint move along the outline rather than going over the outline. This can be accomplished by injecting a force component into the fluid paint simulation system that is perpendicular to the outline, thus causing the digital paint to move along the outline.

Another example manner in which the digital paint is applied is by allowing the digital paint to flow out from the brush at the user selected location. For example, a user can select a location and have digital paint flow out from the brush at that location to fill the region without requiring the user to apply digital paint to the region by moving the brush over the region. This can be combined with other manners discussed herein, such as allowing the digital paint to flow out from the brush at the user selected location and flow outward in multiple directions (e.g., all directions in a 360 degree span) towards the outline, but prevent the digital paint from flowing over the outline.

Various aspects of the interactive region coloring techniques discussed herein are also optionally user-configurable. For example, the brush size (e.g., a maximum size and/or a minimum size) and optionally an algorithm to use to dynamically adjust the brush size based on how close a user selected location is to the outline can be set by user preferences. By way of another example, whether the interactive region coloring techniques use a fluid paint simulation system can be set by user preferences.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium painting environment 100 in an example implementation that is operable to employ interactive region coloring techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of multiple different devices, such as multiple servers utilized by a business to perform operations "over the cloud" as described in FIG. 12.

The computing device 102 is illustrated as including an interactive region coloring system 104. The interactive region coloring system 104 is implemented at least partially in hardware of the computing device 102 to allow a user of the computing device 102 to interactively color a digital medium 106, which is illustrated as maintained in storage 108 of the computing device 102. The digital medium 106 is any of a variety of digital surfaces that can be displayed in a user interface 110 for output, e.g., by a display device 112. The digital medium 106 can be a digital asset such as a digital canvas that has one or more boundary lines (e.g., an outline of a flower such as that illustrated in FIG. 1) or other digital media. Although illustrated as implemented locally at the computing device 102, functionality of the interactive region coloring system 104 may also be implemented in whole or part via functionality available via the network 114, such as part of a web service or "in the cloud."

An example of functionality incorporated by the interactive region coloring system 104 to allow interactive region coloring by a user of the computing device 102 is illustrated as distance/direction determination module 122, brush position determination module 124, brush size determination module 126, and fluid paint simulation system 128. The distance/direction determination module 122 implements functionality to determine one or both of a distance to a nearby point on the outline of the digital medium 106 and a direction to a nearby point on the outline of the digital medium 106. The brush position determination module 124 implements functionality to determine a position of a brush being used for digital painting. This position of the brush is a position on the digital medium 106, and is based on one or both of a distance to a nearby point on the outline of the digital medium 106 and a direction to a nearby point on the outline of the digital medium 106. The brush size determination module 126 implements functionality to determine a size of a brush being used for digital painting. This size of the brush is based on one or both of a distance to a nearby point on the outline of the digital medium 106 and a direction to a nearby point on the outline of the digital medium 106. The fluid paint simulation system 128 implements functionality to describe how digital paint moves or flows over the digital medium 106. How the digital paint moves or flows over the digital medium 106 varies based on one or both of a distance to a nearby point on the outline of the digital medium 106 and a direction to a nearby point on the outline of the digital medium 106.

Figure 2:
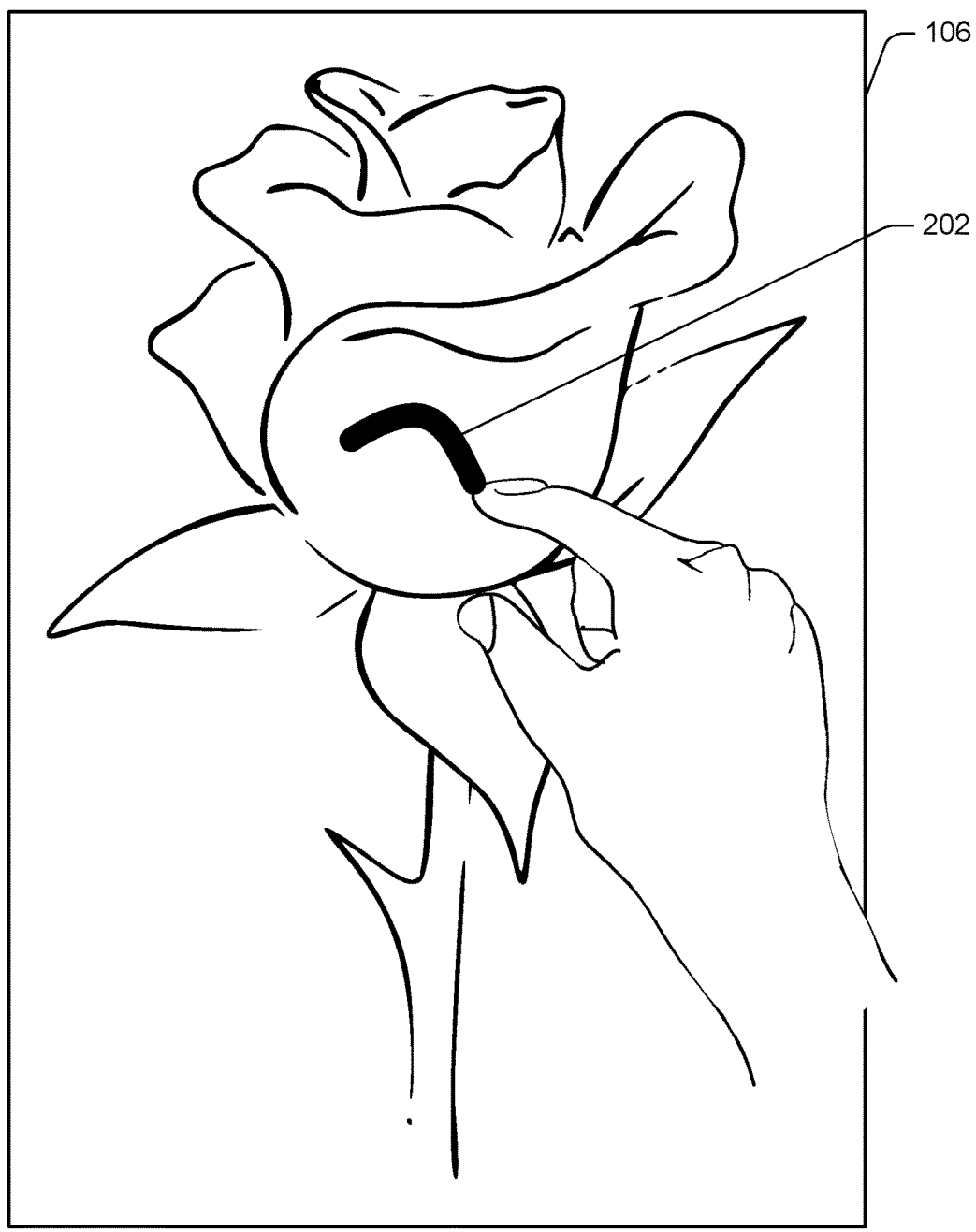
FIG. 2 illustrates an example digital medium displaying an outline that can be colored in by a user using the techniques discussed herein.

FIG. 2 illustrates an example digital medium 106 displaying an outline that can be colored in by a user using the techniques discussed herein. The outline in the example of FIG. 2 is a flower. User inputs selecting different locations on the digital medium 106 are received via a touch input by the user's finger to a touchscreen of the display device 112 in the illustrated example. The user selected locations are used to determine the position of the brush. The position of the brush can be at the user selected location, or the position may be dynamically adjusted as discussed in more detail below. Digital paint is applied at each of the user selected locations from a brush, and the user can color in (fill with digital paint) the outline as he or she desires. The user can drag his or her finger across the touchscreen to create a path of movement of the brush, with digital paint being applied to the digital medium 106 from the brush at each user selected location. The digital paint applied in the example of FIG. 2 is illustrated as digital paint 202.

Returning to FIG. 1, the distance/direction determination module 122 implements functionality to determine one or both of a distance to a nearby point on the outline of the digital medium 106 and a direction to a nearby point on the outline of the digital medium 106. The distance/direction determination module 122 generates, for each of one or more pixels on the digital medium 106, one or both of a distance to a nearby point on the outline of the digital medium 106. The distance/direction determination module can generate one or both of a distance to a nearby point on the outline of the digital medium 106 for each pixel on the digital medium 106, or alternatively only some of the pixels on the digital medium 106 (e.g., pixels that are not on the outline, pixels that are within a particular pre-defined area surrounding the outline).

The outline is made up of a set of one or more lines that are a template or outline on the digital medium 106. The outline can be of a particular object or place, can be an abstract or random collection of lines, and so forth. In the illustrated example of FIG. 1, the outline is a flower.

For a given pixel on the digital medium 106, in one example the nearby point is the closest point (e.g., the closest pixel) on the outline to the given pixel. Additionally or alternatively, for a given pixel on the digital medium 106 the nearby point can be another point (e.g., another pixel) on the outline that is within a threshold distance (e.g., 5 pixels) of the closest point. The distance to the nearby point is a scalar value and can be measured in any units, such as pixels. The direction to the nearby point is a vector value and can be measured in any units, such as degrees in a polar coordinate system. The distance and/or direction values can be stored in various different manners, such as by using a bitmap, using a quad tree, or using any other public and/or proprietary data structure.

For example, the distance and direction values can be stored using a bitmap in which each of multiple pixels (e.g., all of the pixels) has RGB (Red, Green, Blue) channels.

Each channel has a value of a particular size (e.g., 8 bits or 16 bits). One channel (e.g., the R channel) encodes a value that is the distance from the pixel to the nearby point on the outline. Each of the other two channels (e.g., the G and B channels) encodes a value that is one dimension of a 2-dimensional normalized cartesian vector that is the direction from the pixel to the nearby point on the outline (e.g., the G channel can encode the X component of the vector and the B channel can encode the Y component of the vector).

By way of another example, one channel (e.g., the R channel) encodes a value that is the distance from the pixel to the nearby point on the outline, and another channel (e.g., the G channel) encodes a value that is the angle toward the nearby point on the outline. In this example, the third channel (e.g., the B channel) can store other data (e.g., a biased or normalized angle from the pixel to the nearby point on the outline).

The distance to the nearby point can be a signed or an unsigned value. In situations in which the distance is a signed value, the sign of the distance value indicates whether the pixel is inside or outside the outline. A pixel is inside the outline if the pixel is fully surrounded by one or more lines of the outline; otherwise, the pixel is outside the outline. For example, a positive value indicates that the pixel is inside the outline and a negative value indicates that the pixel is outside the outline. If the distance value is unsigned then the value indicates a distance to the closest point of the outline without indicating whether the pixel is inside or outside the outline.

Figure 3:
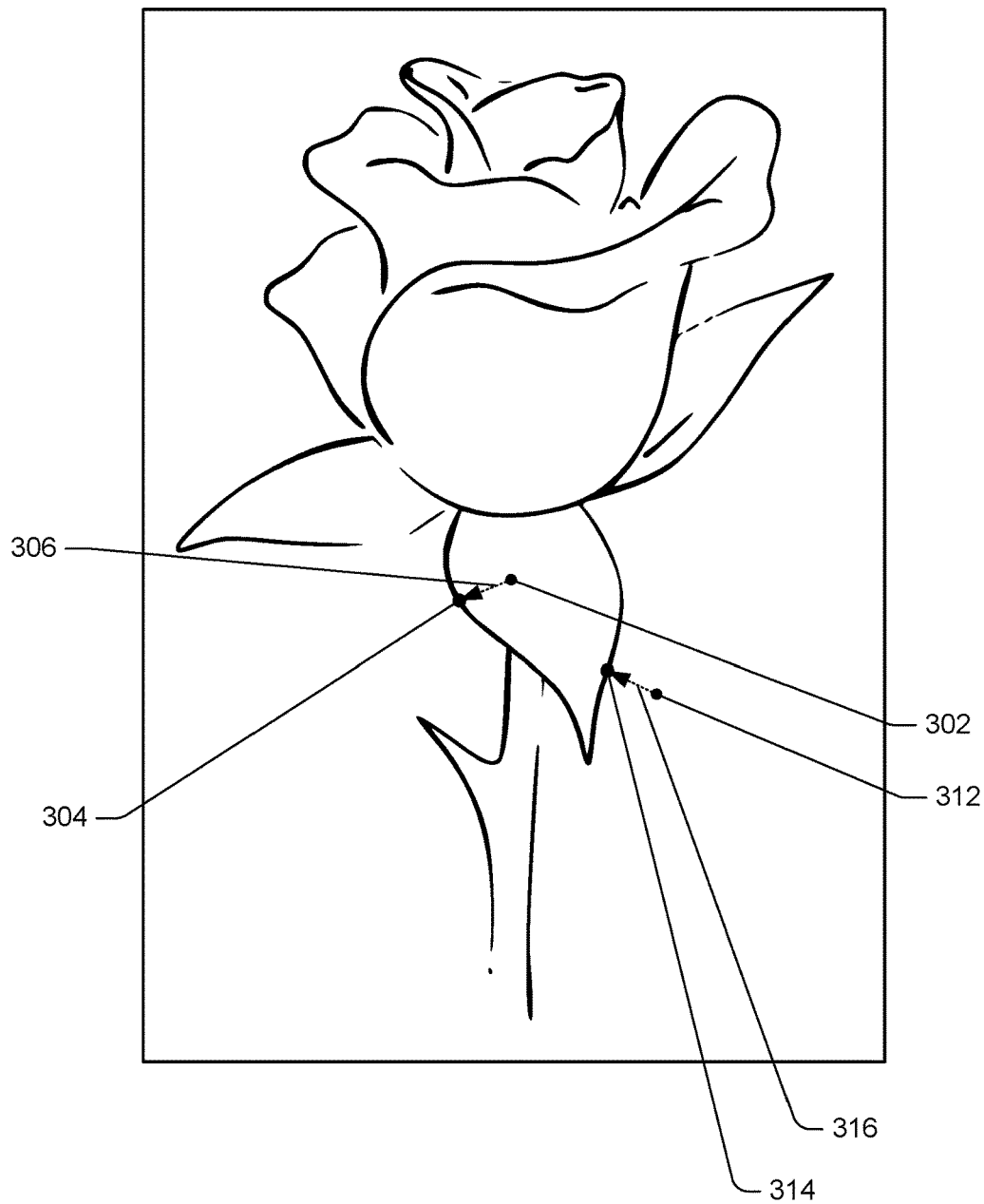
FIG. 3 illustrates an example of the distance and direction values discussed herein.

FIG. 3 illustrates an example of the distance and direction values discussed herein. The digital medium 106 is illustrated with an outline that is a flower. An example pixel 302 has a nearby point 304 on the outline, and the distance to the nearby point 304 is the scalar distance between pixel 302 and nearby point 304. The arrowed dashed line 306 illustrates the direction from the pixel 302 to the nearby point 304. If the distance value is signed, then the scalar distance between pixel 302 and nearby point 304 is positive because the pixel 302 is inside the outline.

An additional example pixel 312 has a nearby point 314 on the outline, and the distance to the nearby point 314 is the scalar distance between pixel 312 and nearby point 314. The arrowed dashed line 316 illustrates the direction from the pixel 312 to the nearby point 314. If the distance value is signed, then the scalar distance between pixel 312 and nearby point 314 is negative because the pixel 312 is inside the outline.

Returning to FIG. 1, the interactive region coloring system 104 receives a user selection of a location on the digital medium 106 to which the user desires to apply paint. The user selection can be received in any of a variety of different manners, such as by using a cursor control device to maneuver a cursor to a user desired location and clicking a button on the cursor control device, by touching (e.g., with a finger, stylus, or other object) a location on the display device 112 (e.g., if the display device 112 is a touchscreen), and so forth. In response to the user selection of a location on the digital medium 106, the distance/direction determination module 122 obtains one or both of the distance from the location to a nearby point on the outline and the direction from the location to a nearby point on the outline. The user-selected location can and typically does cover multiple pixels on the digital medium 106. The distance/direction determination module 122 can determine one or both of the distance from the location to a nearby point on the outline and the direction from the location to a nearby point on the outline based using any of a variety of public and/or proprietary techniques.

In one example, the user-selected location is a geometric shape (e.g., an approximately circular shape) having an approximate center, and the distance from the user-selected location to a nearby point on the outline is the distance from the center of the geometric shape (e.g., the pixel on the digital medium 106 that is approximately at the center of the geometric shape) to the nearby point. Additionally or alternatively, other distances can be used as the distance from the user-selected location to a nearby point on the outline, such as the distance from another pixel in the geometric shape (e.g., a pixel on the geometric shape that is closest to the nearby point), based on multiple pixels in the geometric shape (e.g., average the distances for multiple, such as all, of the pixels in the geometric shape), and so forth.

Similarly, in one example the direction from the user-selected location to a nearby point on the outline is the direction from the center of the geometric shape (e.g., the pixel on the digital medium 106 that is approximately at the center of the geometric shape) to the nearby point. Additionally or alternatively, other directions can be used as the direction from the user-selected location to a nearby point on the outline, such as the direction from another pixel in the geometric shape (e.g., a pixel on the geometric shape that is closest to the nearby point), based on multiple pixels in the geometric shape (e.g., average the directions for multiple, such as all, of the pixels in the geometric shape), and so forth.

Brush Size Dynamic Adjustment

The brush size determination module 126 determines the manner in which the digital paint is applied to the digital medium 106 by dynamically adjusting the brush size so that the farther away the location is from the outline (i.e., the larger the distance value) the bigger the brush is, and the closer the location is to the outline (i.e., the smaller the distance value) the smaller the brush is. Larger brush sizes cover more pixels on the digital medium 106 than smaller brush sizes. Dynamically adjusting the brush size based on the distance to the outline makes it more difficult for the user to go over the outline when applying digital paint because the brush size is smaller closer to the outline and the user can more accurately place the brush on the digital medium 106. Further, dynamically adjusting the brush size based on the distance to the outline makes it easier for the user to quickly apply digital paint in the middle of a region because the brush size is larger.

Figure 4:
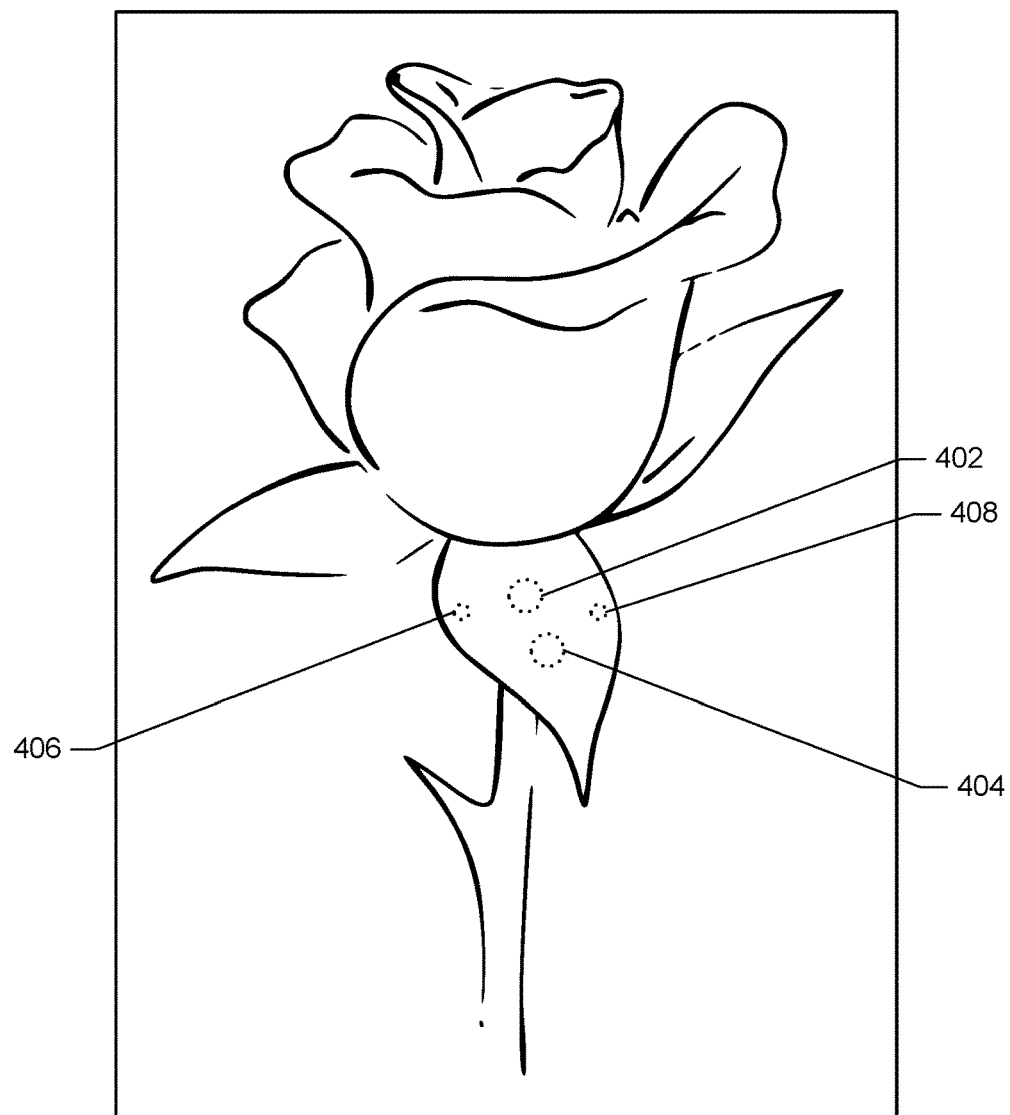
FIG. 4 illustrates an example implementation of dynamically adjusting the brush size.

FIG. 4 illustrates an example implementation of dynamically adjusting the brush size. The brush sizes are shown as dashed circles on the flower petal. Brush sizes 402 and 404 for locations further from a nearby point on the outline of the flower petal are larger, and brush sizes 406 and 408 for locations closer to a nearby point on the outline of the flower petal are smaller.

The manner in which the brush size is determined based on the distance to the nearby point can be determined in a variety of different manners. In one example manner of determining the brush size an algorithm is applied to calculate, based on the distance to the nearby point, the brush size between a maximum brush size and a minimum brush size. The algorithm can be linear or non-linear (e.g., exponential). Additionally or alternatively, other techniques can be used to determine the brush size, such as accessing a table or other data structure of distance to brush size mappings. Various aspects of dynamically adjusting the brush size are optionally user configurable. For example, user preference settings can be received from the user indicating the maximum brush size, the minimum brush size, the algorithm to use, and so forth.

Brush Position Dynamic Adjustment

The brush position determination module 124 determines the manner in which the digital paint is applied to the digital medium 106 by dynamically changing the position of the brush. When the user selected location is close to the outline, the position of the brush is altered as appropriate to follow the outline rather than going over the outline. This allows the user to apply digital paint up to, but not go over (e.g., beyond), the outline. Thus, if a user has difficulty painting right up to the line due to the size of his or her finger that is controlling the brush or difficulty holding his or her finger steady, the digital paint is still applied close to (but not over) the outline.

In one implementation, the brush position determination module 124 determines how much (if any) the user selected location is beyond the outline. If the user selected location is less than a threshold amount beyond (on the other side of) the outline, then the brush position determination module 124 alters the position of the brush to be along (but not go over) the outline. This threshold amount beyond the outline can be determined in different manners, such as how far a particular pixel of the user selected location (e.g., an approximate center of the geometric shape of the user selected location, a pixel in the geometric shape of the user selected location that is closest to or farthest from outline) is from the outline. If particular pixel is at least a threshold distance (e.g., 15 or 30 pixels) beyond the outline then the brush position determination module 124 determines that the user selected location is beyond the outline. However, if the particular pixel is not at least the threshold distance (e.g., 15 or 30 pixels) beyond the outline then the brush position determination module 124 determines that the user selected location is not beyond the outline.

In situations in which the brush position determination module 124 changes the position of the brush, the change is made so that the brush is positioned so that no pixels covered by the brush are beyond the outline (e.g., the pixels covered by the brush are all within the outline). The change is also optionally made so that as many of the pixels in the user selected location as possible are covered by the brush. The brush position determination module 124 can also optionally take into account a path of movement of the brush, and change the position to a previous brush position along the path of movement of the brush. For example, the brush position determination module 124 can change the position to the most recent position along the path of movement of the brush that did not go beyond the outline.

Thus, in contrast to a mask layer that prohibits a user from painting in a region beyond the outline, the user is still allowed to apply digital paint to the digital medium 106 even if the user selected location is beyond the outline, although with the position of the brush being changed. Furthermore, if the user selected location is far enough beyond the outline, then the position of the brush is not changed and the user is able to apply digital paint to the digital medium 106 beyond the outline.

FIG. 5 illustrates an example implementation of dynamically adjusting the brush position. Multiple examples of user selections and the corresponding brush position, changed as appropriate by the brush position determination module 124, are shown in FIG. 5. At 502, a user selection 504 is shown that is inside the outline of a flower petal. The user selection 504 does not go beyond the outline of the flower petal, so the brush position determination module 124 does not change the position of the brush. The result is shown at 506 with paint 508 being applied at the user selected location.

At 512, a user selection 514 is shown that is partially beyond the outline of a flower petal. The brush position determination module 124 determines that the user selection 514 is less than the threshold amount beyond the outline of the flower petal, so the brush position determination module 124 changes the position of the brush. The result is shown at 516 with paint 518 being applied within the outline.

At 522, a user selection 524 is shown that is beyond the outline of a flower petal. The brush position determination module 124 determines that the user selection 514 is greater than the threshold amount beyond the outline of the flower petal, so the brush position determination module 124 does not change the position of the brush. The result is shown at 526 with paint 528 being applied at the user selected location.

Force Injection to Fluid Paint Simulation System

Returning to FIG. 1, the fluid paint simulation system 128 models the flow of paint when applied to a paper, canvas, or other medium so that the digital paint flows in a similar manner when applied to digital medium 106. The fluid paint simulation system 128 is a set of fluid mechanics equations that describes how the digital paint moves or flows over the digital medium. Generally, the digital paint is a set of particles in the fluid paint simulation system, and every turn the simulation runs it determines where the particles go and how quickly the particles get absorbed into the digital medium (and when the digital paint is absorbed into the digital medium the digital paint stops moving). Various different forces can be factored into the set of fluid mechanics equations, such as the path of movement of the brush, a speed of the movement of the brush, the viscosity of the paint, and so forth. Any of a variety of different public and/or proprietary techniques can be used to implement the fluid paint simulation system 128.

The interactive region coloring system 104 injects one or more additional forces into the fluid paint simulation system 128 that are based on one or both of the distance to a nearby point and a direction to the nearby point as determined by the distance/direction determination module 122. Thus, once the digital paint is applied to the digital medium 106, the fluid paint simulation system 128 causes the digital paint to flow outward from the paint brush for a duration of time without further user input or brush movement, and this flow is based at least in part on one or both of the distance to a nearby point and a direction to the nearby point.

One example manner in which the digital paint is applied is by having the fluid paint simulation system 128 have the digital paint move towards the nearby point of the outline. This is accomplished by injecting a force component into the fluid paint simulation system based at least in part on the direction value determined by the distance/direction determination module 122 that causes the fluid paint simulation system 128 to flow the digital paint towards the nearby point of the outline.

In one example, the force injected into the fluid paint simulation system 128 causes the digital paint to flow towards the nearby point in response to the position of the brush being greater than a threshold distance (e.g., 50 pixels) of the nearby point. In situations in which the position of the brush is less than the threshold distance (e.g., 50 pixels), the force injected into the fluid paint simulation system 128 causes the paint to flow away from the nearby point (e.g., opposite the direction to the nearby point), thus helping prevent the paint from flowing over the outline.

Figure 6:
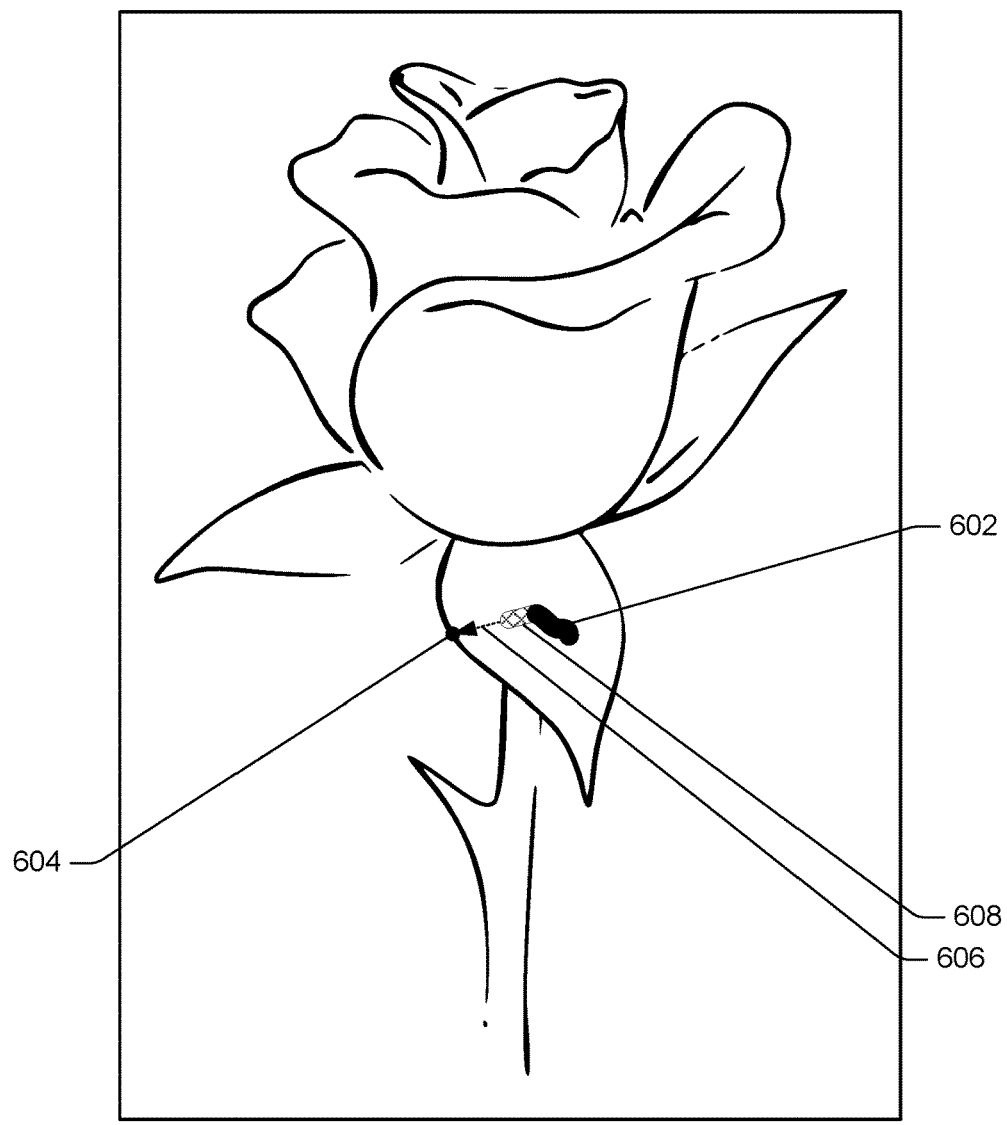
FIG. 6 illustrates an example implementation of flowing paint towards the nearby point on the outline.

FIG. 6 illustrates an example implementation of flowing paint towards the nearby point on the outline. The digital medium 106 is illustrated with an outline that is a flower. Digital paint is applied to the digital medium 106 along a path 602 resulting from user selection of multiple locations (e.g., the user moving his or her finger across a touchscreen of the display device 112). The digital paint applied along the path 602 is illustrated as a solid line in FIG. 6. The most recently user selected location has a nearby point 604 on the outline, and arrowed dashed line 606 illustrates the direction from the most recently user selected location to the nearby point 604. The fluid paint simulation system 128 causes the digital paint to flow in the direction of arrowed dashed line 606 towards the nearby point 604, illustrated with cross-hatching as digital paint 608.

Figure 7:
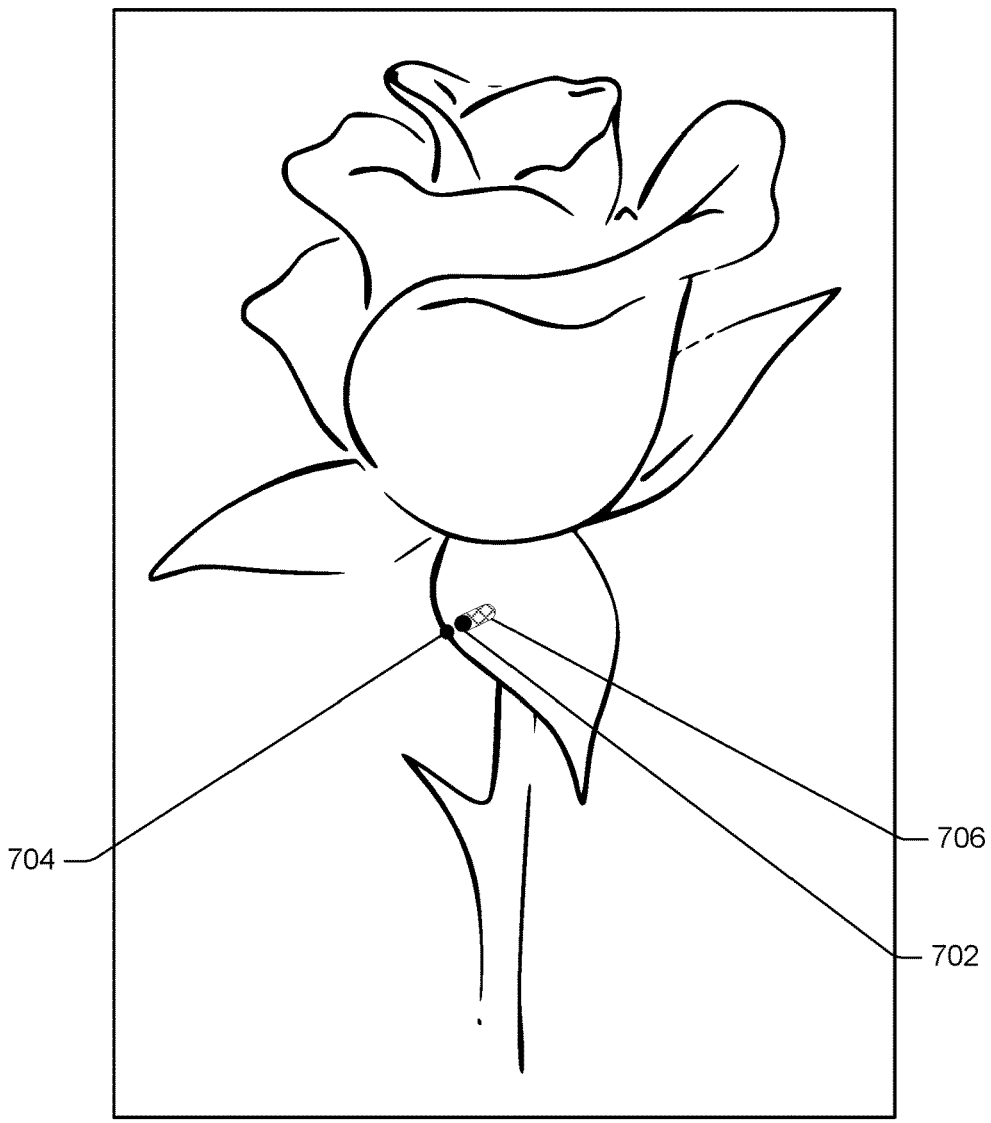
FIG. 7 illustrates an example implementation of flowing paint away from the nearby point on the outline.

FIG. 7 illustrates an example implementation of flowing paint away from the nearby point on the outline. The digital medium 106 is illustrated with an outline that is a flower. Digital paint is applied to the digital medium 106 at a user selected location 702. The user selected location has a nearby point 704 on the outline. The fluid paint simulation system 128 causes the digital paint to flow away from the nearby point 704, such as in the opposite direction of the direction from the user selected location 702 to the nearby point 704, illustrated with crosshatching as digital paint 706.

In another example, the distance to the nearby point on the outline is a signed value, and the force injected into the fluid paint simulation system 128 causes the digital paint to flow towards the nearby point on the outline or away from the nearby point on the outline in response to the sign of the distance value. In situations in which the sign of the distance value indicates that the pixel is inside the outline (e.g., the distance value is positive), the force injected into the fluid paint simulation system 128 causes the paint to flow toward the nearby point (e.g., in the direction to the nearby point), thus helping paint the area inside the outline. In situations in which the sign of the distance value indicates that the pixel is outside the outline (e.g., the distance value is negative), the force injected into the fluid paint simulation system 128 causes the paint to flow away from the nearby point (e.g., opposite the direction to the nearby point), thus helping the user color the background of the digital medium by preventing the paint from flowing over the outline.

Another example manner in which the digital paint is applied is by having the fluid paint simulation system 128 have the digital paint move (or not move) towards the nearby point of the outline if the user selected location is beyond the outline by a small amount. For example, in situations in which the sign of the distance value indicates that the pixel is outside the outline (e.g., the distance value is negative), and the distance value indicates that the pixel is less than a threshold distance (e.g., 15 or 30 pixels) beyond the outline, then the force injected into the fluid paint simulation system 128 causes the paint to flow toward the nearby point (e.g., in the direction to the nearby point). The paint can flow toward the nearby point and stop at the nearby point, or alternatively can flow inside the outline (e.g., a number of pixels into the outline equal to the absolute value of the distance value). Furthermore, the digital paint can evaporate or disappear as it flows (the digital paint is deleted or removed from the digital medium 106), leaving behind no visual trace that paint was applied to the user selected location. On the other hand, in situations in which the sign of the distance value indicates that the pixel is outside the outline (e.g., the distance value is negative), and the distance value indicates that the pixel is at least a threshold distance (e.g., 15 or 30 pixels) beyond the outline, then no such force is injected into the fluid paint simulation system 128. Thus, in situations in which the user paints over (e.g., has user selected locations) a little bit beyond the outline, the paint effectively flows back towards the outline leaving behind no trace that locations beyond the outline were selected. However, in situations in which the user paints over (e.g., has user selected locations) further beyond the outline, the paint does not flow back towards the line and remains on the digital medium 106.

Figure 8:
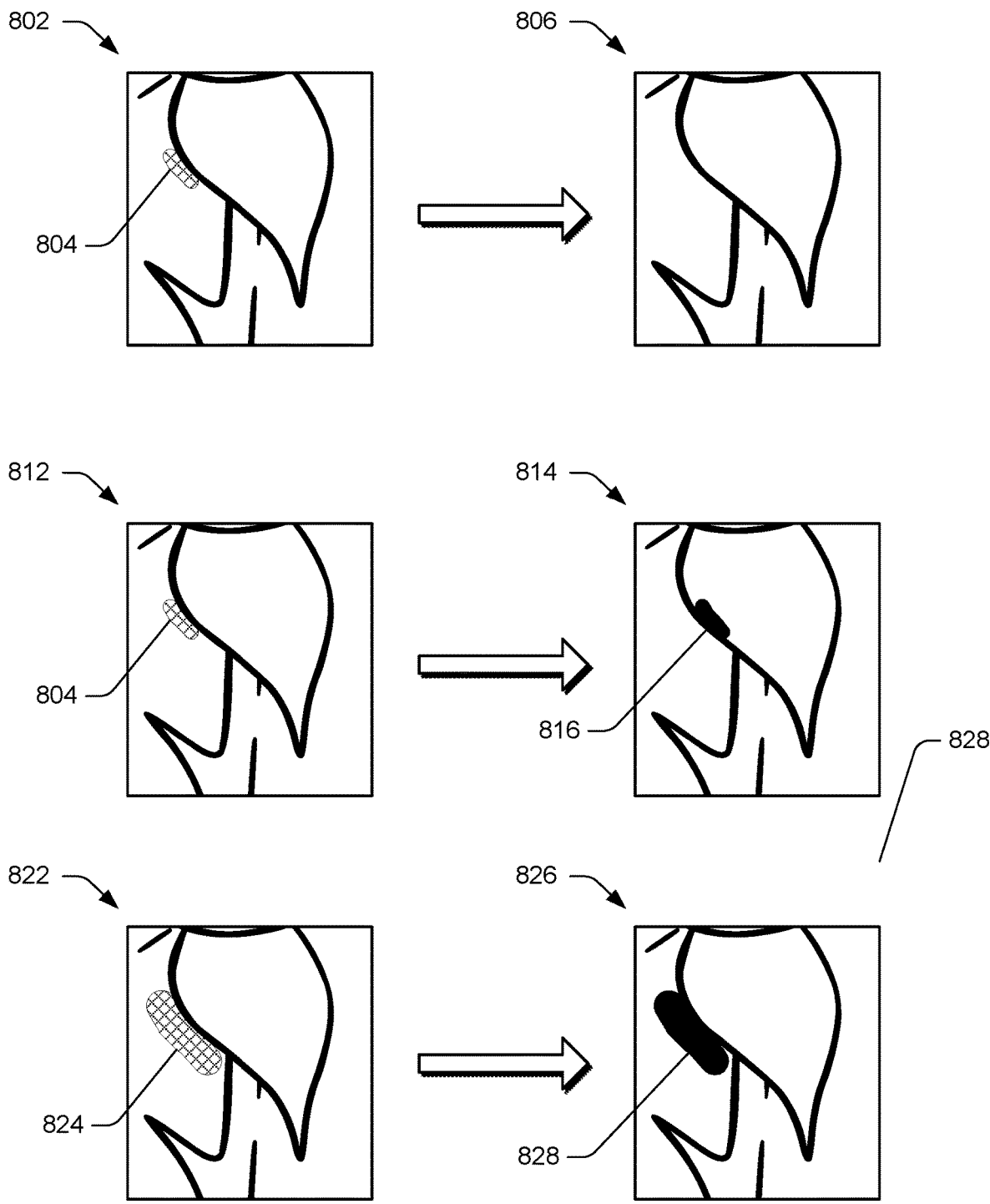
FIG. 8 illustrates an example implementation of flowing paint based on a distance from the outline.

FIG. 8 illustrates an example implementation of flowing paint based on a distance from the outline. Multiple examples of user selections and the corresponding digital paint behavior are shown in FIG. 8. At 802, user selections 804 are shown with cross-hatching. The user selections 804 are outside the outline of a flower petal and within a threshold distance (e.g., 15 or 30 pixels) of the outline. The user selections 804 are within the threshold distance, so the paint flows back towards the outline and disappears as it flows. The result is shown at 806 with no paint remaining at the user selected locations 804.

At 812, the user selections 804 are outside the outline of a flower petal and within a threshold distance (e.g., 15 or 30 pixels) of the outline. The user selections 804 are within the threshold distance, so the paint flows back towards the outline and disappears from outside the outline as it flows. Furthermore, the paint crosses over the outline and continues to flow (in the same direction, but once inside the outline flows away from the outline) for a number of pixels that is equal to the absolute value of the distance value. The result is shown at 814 with no paint remaining at the user selected locations 804, but the paint having flowed inside the outline as paint 816.

At 822, user selections 824 are shown with cross-hatching. The user selections 824 are outside the outline of a flower petal and at least a threshold distance (e.g., 15 or 30 pixels) beyond the outline. The user selections 824 are beyond the threshold distance, so the paint does not flow back towards the outline. The result is shown at 826 with paint 828 being applied at the user selected locations 824.

Returning to FIG. 1, the speed at which the digital paint moves towards the outline can optionally vary based on the distance to the outline, such as moving faster when the position of the brush is farther away from the outline (i.e., the larger the distance value to the nearby point), and moving slower when the position of the brush is closer to the outline (i.e., the smaller the distance value to the nearby point). This difference in speed is accomplished by injecting a force component into the fluid paint simulation system based at least in part on the distance value determined by the distance/direction determination module 122 that causes the fluid paint simulation system 128 to flow at different speeds based on the distance value.

The manner in which the speed at which the digital paint is to flow can be determined in a variety of different manners. One example way in which the speed is determined is by using an algorithm to calculate, based on the distance to the nearby point, the speed at which the digital paint is to flow between a maximum speed and a minimum speed. The algorithm can be linear or non-linear (e.g., exponential). Additionally or alternatively, other techniques can be used to determine the speed at which the digital paint is to flow, such as accessing a table or other data structure of distance to speed mappings.

Various aspects of having the digital paint move towards the nearby point of the outline are optionally user configurable. For example, user preference settings can be received from the user indicating the maximum speed, the minimum speed, the algorithm to use, how heavily to weight the direction to the nearby point in determining the flow of the digital paint, how heavily to weight the distance to the nearby point in determining the flow of the digital paint, and so forth.

Another example manner in which the digital paint is applied is by having the fluid paint simulation system 128 have the digital paint move along the outline rather than going over the outline. This can be accomplished by injecting a force component into the fluid paint simulation system 128 that is perpendicular to the outline, thus causing the digital paint to move along the outline.

Figure 9:
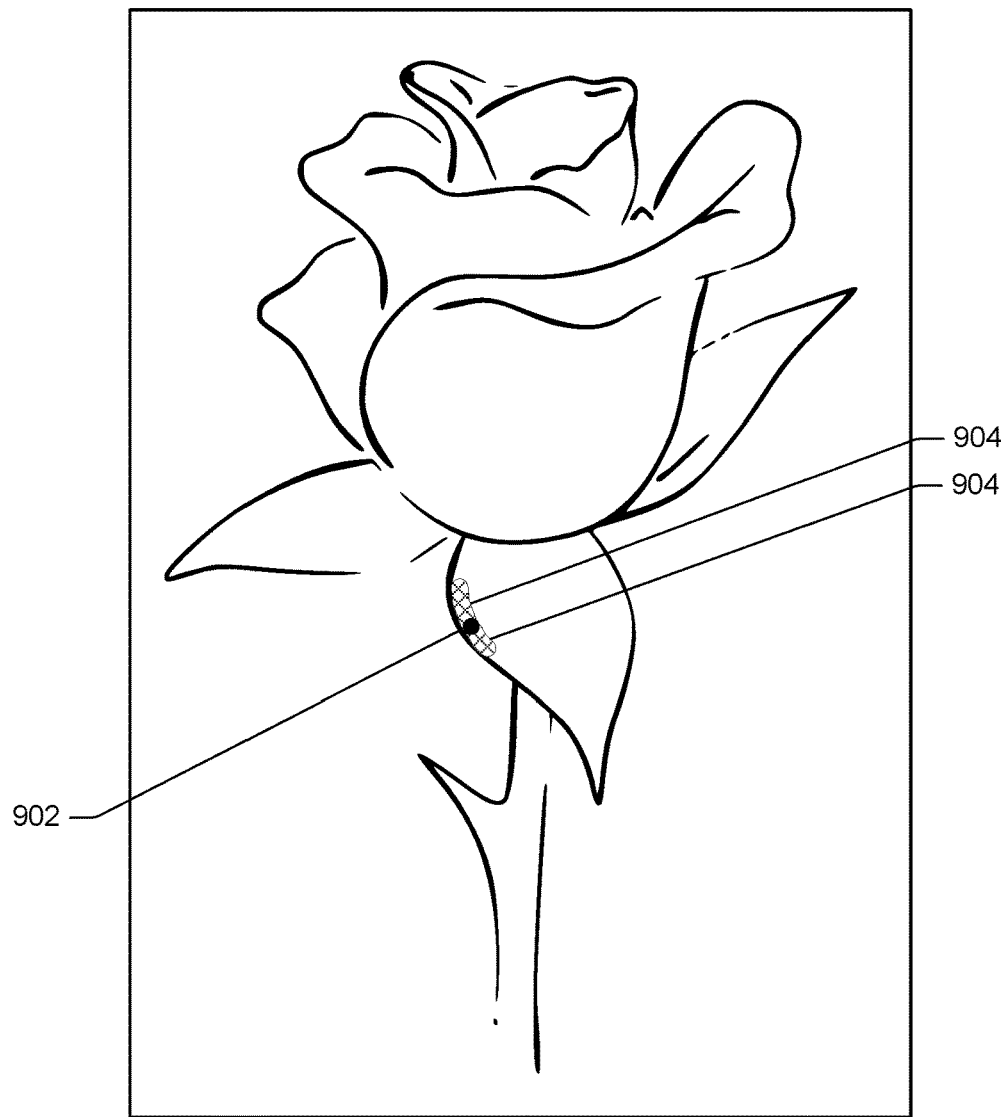
FIG. 9 illustrates an example implementation of flowing paint along the outline.

FIG. 9 illustrates an example implementation of flowing paint along the outline. The digital medium 106 is illustrated with an outline that is a flower. Digital paint is applied to the digital medium 106 at a user selected location 902. The fluid paint simulation system 128 causes the digital paint to flow perpendicular to the outline (e.g., at each pixel along the outline, the digital paint flow perpendicular to the outline at that pixel), illustrated with crosshatching as digital paint 904. In the illustrated example the digital paint flows in both directions away from the user selected location 902 and perpendicular to the outline, although alternatively the digital paint can flow in only one direction away from the user selected location 902. The example of FIG. 9 is similar to the example of FIG. 7 discussed above, although the paint flows along the outline in FIG. 9 as opposed to in the opposite direction of the direction from the user selected location 702 to the nearby point 704 in FIG. 7.

Furthermore, the manner in which the digital paint is applied optionally includes having digital paint flow out from the brush at the user selected location, and continue to flow as the location remains selected (e.g., the user keeps his or her finger touching the touchscreen of the display device 112 at the same location). For example, a user can select a location and have digital paint flow out from the brush at that location to fill the region without requiring the user to apply digital paint to the region by moving the brush over the region. This can be accomplished by, for example, continuing to provide additional ink to the fluid paint simulation system 128 while the location remains selected, effectively having the fluid paint simulation system 128 account for the brush touching the selected location repeatedly.

This allowing the paint to flow can also be combined with other manners discussed herein. For example, the fluid paint simulation system 128 can allow the digital paint to flow out from the brush at the user selected location and flow outward in multiple directions (e.g., all directions in a 360 degree span) towards the outline, but prevent the digital paint from going over the outline.

Figure 10:
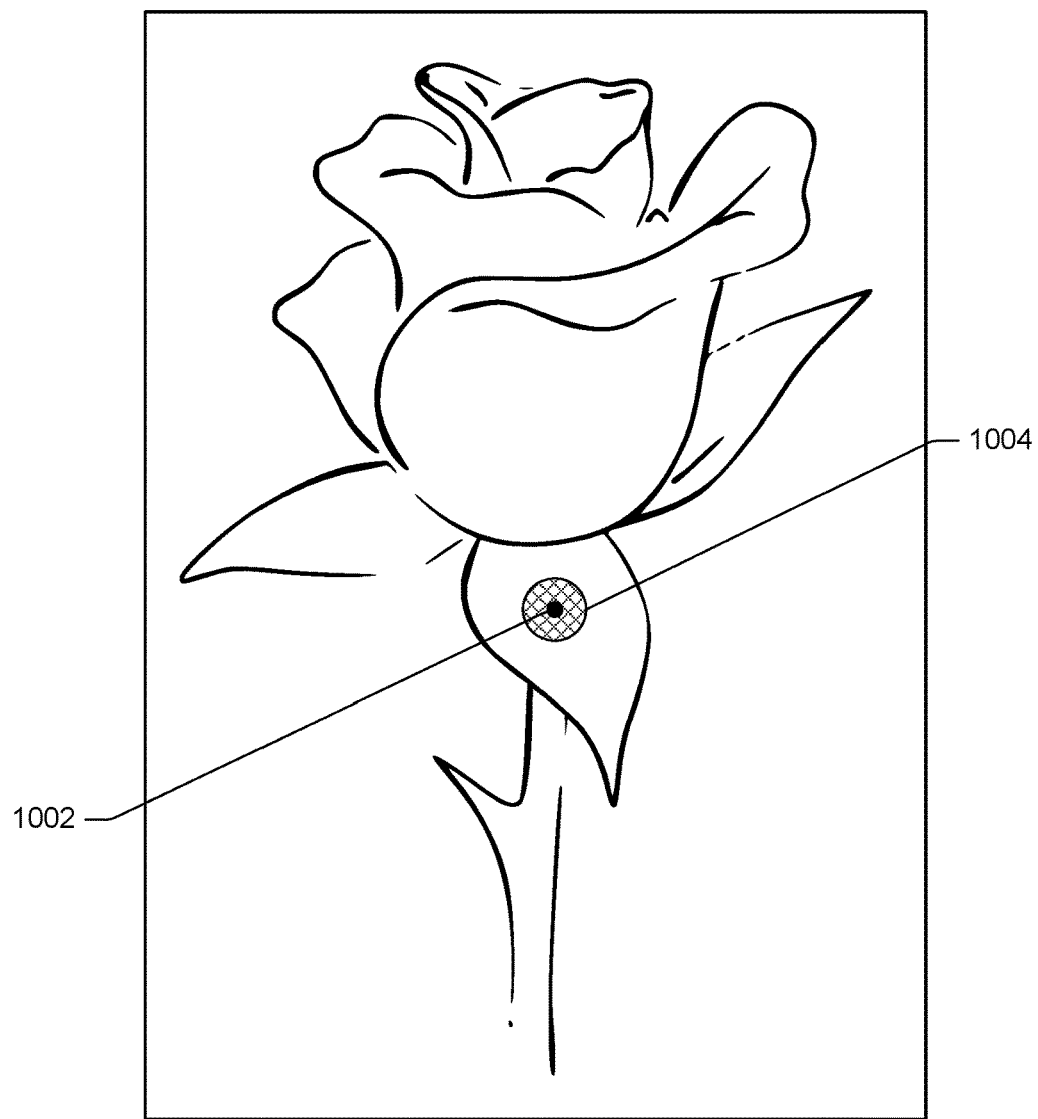
FIG. 10 illustrates an example implementation of digital paint flowing out from the brush at the user selected location.

FIG. 10 illustrates an example implementation of digital paint flowing out from the brush at the user selected location. The digital medium 106 is illustrated with an outline that is a flower. Digital paint is applied to the digital medium 106 at a user selected location 1002. The fluid paint simulation system 128 causes the digital paint to flow out in a 360 degree span, illustrated with crosshatching as digital paint 1004.

Returning to FIG. 1, in contrast to fluid paint simulation system that only simulate reality, it should be noted that the fluid paint simulation system 128 can thus incorporate forces that are not simulating reality. The fluid paint simulation system 128 can have the digital paint flow in a particular direction (e.g., towards or away from the nearby point), or along the outline, to facilitate coloring the region.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Procedure

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-10.

FIG. 11 is a flow diagram depicting a procedure in an example implementation of interactive region coloring. In this example, the interactive region coloring system 104 receives a user input selecting a location to apply digital paint to a region of a digital medium 106 (block 1102). The user input can be received in various manners, such as via a mouse or other cursor control device, detecting an object (e.g., finger or stylus) touching a touchscreen of the display device 112, and so forth.

The distance/direction determination module 122 obtains one or both of a direction value identifying a direction from the location towards a nearby point on the outline and a distance value identifying a distance from the location to the nearby point (block 1104). The distance/direction determination module 122 can generate one or both of the direction value and the distance value in response to the user input, or alternatively can have previously calculated one or both of the direction value and the distance value and retrieve the previously calculated direction and/or distance value in response to the user input.

The interactive region coloring system 104 determines a manner in which the digital paint is applied to the region based at least in part on one or both of the distance value and the direction value (block 1106). This determination can be made in a variety of different manners. In one example, the determination is made by the brush size determination module 126 dynamically adjusting a brush sized used to apply the digital paint based on a distance from the location to the nearby point (block 1108). Additionally or alternatively, the determination is made by the brush position determination module 124 dynamically adjusting the brush position based on distance from the location to the nearby point (block 1110). Additionally or alternatively, the determination is made by the fluid paint simulation system 128 having the digital paint flow from the location towards the nearby point of the outline (block 1112). Additionally or alternatively, the determination is made by the fluid paint simulation system 128 having the digital paint flow along the outline rather than going over the outline (block 1114). Additionally or alternatively, the determination is made by the fluid paint simulation system 128 having the digital paint flow out from the brush at the user selected location (block 1116).

The interactive region coloring system 104 then displays the region with the digital paint applied in the determined manner (block 1118).

Example System and Device

Figure 12:
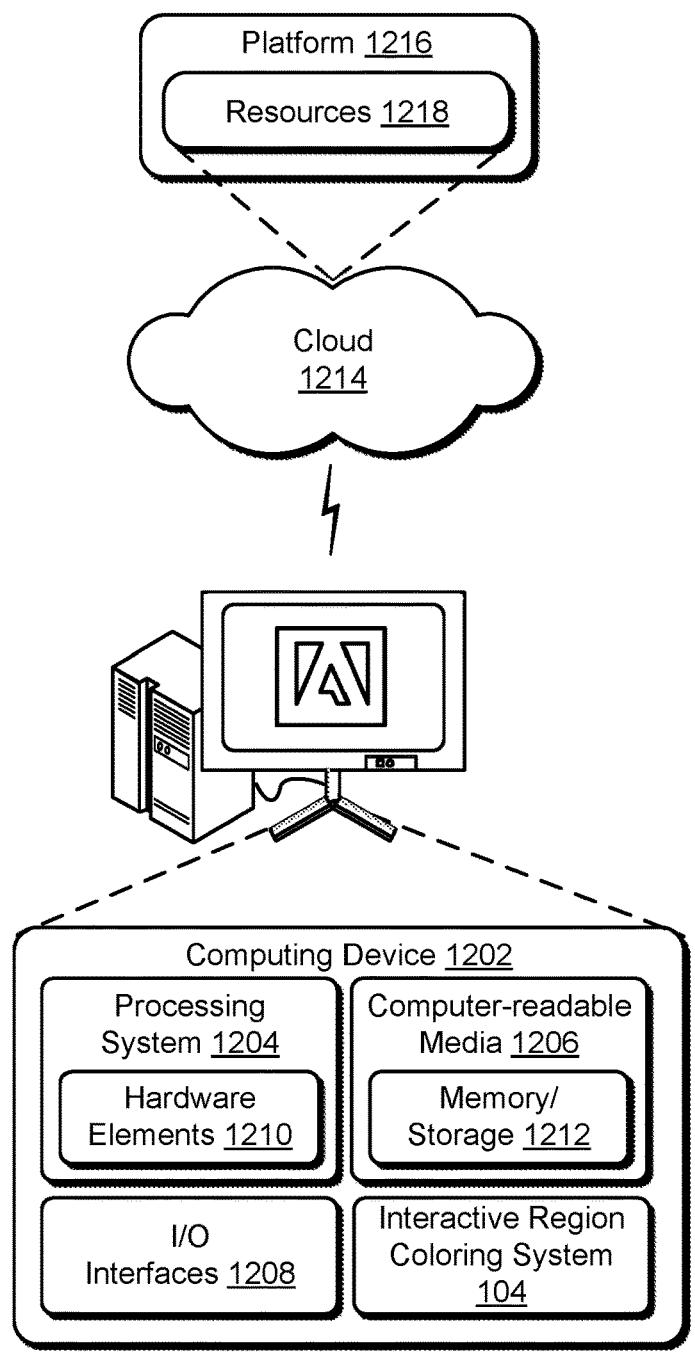
FIG. 12 illustrates an example system including various components of an example device that can be implemented as any type of computing device as described and/or utilize with reference to FIGS. 1-11 to implement embodiments of the techniques described herein.

FIG. 12 illustrates an example system generally at 1200 that includes an example computing device 1202 that is representative of one or more computing systems and/or devices that may implement the various techniques described herein. This is illustrated through inclusion of the interactive region coloring system 104. The computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device embodiment, implementation of functionality described herein may be distributed throughout the system 1200. For example, the functionality may be implemented in part on the computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium painting environment, a method implemented by at least one computing device, the method comprising:
    receiving, by the at least one computing device, a user input selecting a location to apply digital paint to a region of a digital medium, the region being surrounded at least in part by an outline that is a set of one or more lines;
    determining, by the at least one computing device, a nearby point on the outline that is within a threshold number of pixels of being a closest point spatially on the outline to the location;
    obtaining, by the at least one computing device, a distance value identifying a spatial distance from the location to the nearby point on the outline;
    determining, by the at least one computing device, a manner in which the digital paint is applied to the region based at least in part on the distance value; and
    displaying, by the at least one computing device, the region with the digital paint applied in the determined manner.

2. The method as described in claim 1, the distance value comprising a signed distance value, the signed distance value being a positive value if the location is inside the outline, and the signed distance value having a negative value if the location is outside the outline.

3. The method as described in claim 1, the location comprising a geometric shape covering multiple pixels of the digital medium, the distance value comprising a spatial distance from the approximate center of the geometric shape to the nearby point.

4. The method as described in claim 1, the determining the manner in which the digital paint is applied to the region comprising dynamically adjusting, by the at least one computing device, a brush size of a brush used to apply the digital paint, the dynamically adjusting comprising using smaller brush sizes in response to determining the distance from the location to the nearby point is smaller than in response to determining the distance from the location to the nearby point is larger.

5. The method as described in claim 4, further comprising receiving additional user inputs selecting additional locations to apply paint to the region, the dynamically adjusting comprising reducing the brush size in response to determining that the additional locations are moving closer to the nearby point, and increasing the brush size in response to determining that the additional locations are moving further from the nearby point.

6. The method as described in claim 1, the determining the manner in which the digital paint is applied to the region comprising dynamically adjusting, by the at least one computing device, a position of a brush used to apply the digital paint, the dynamically adjusting comprising:
    determining whether the location is beyond the outline and whether a spatial distance between the location and the outline is less than a threshold distance;
    in response to determining that the location is beyond the outline and the special distance between the location and the outline is less than the threshold distance:
        changing a position of the brush to be within the outline, and
        using, as the location, the changed position of the brush; and in response to determining that the location is beyond the outline and the special distance between the location and the outline is not less than the threshold distance, using the location as the position of the brush.

7. The method as described in claim 1, the determining the manner in which the digital paint is applied to the region comprising injecting, by the at least one computing device, a force into a fluid paint simulation system to cause the digital paint to flow from the location towards the nearby point.

8. The method as described in claim 7, the method further comprising obtaining, by the at least one computing device, a direction value identifying a spatial direction from the location towards the nearby point on the outline, and the determining the manner in which the digital paint is applied to the region further comprising injecting, by the at least one computing device, an additional force into the fluid paint simulation system to cause the digital paint to flow towards the nearby point faster when a position of a brush used to apply the digital paint is further from the nearby point and slower when the position of the brush is closer to the nearby point.

9. The method as described in claim 1, the determining the manner in which the digital paint is applied to the region comprising injecting, by the at least one computing device, a force into a fluid paint simulation system to cause the digital paint to flow from the location along the outline rather than flowing over the outline.

10. The method as described in claim 1, the determining the manner in which the digital paint is applied to the region comprising allowing the digital paint to flow outward from the location while the location remains user selected.

11. The method as described in claim 1, the method further comprising obtaining, by the at least one computing device, a direction value identifying a spatial direction from the location towards the nearby point on the outline, and the determining comprising determining the manner in which the digital paint is applied to the region based at least in part on both the distance value and the direction value.

12. In a digital medium painting environment, a system comprising:
   a distance/direction determination module implemented at least partially in hardware of a computing device to determine a nearby point on an outline surrounding a region that is within a threshold number of pixels of being a closest point spatially on the outline to a user selected location and to obtain a distance value identifying a spatial distance from the location to the nearby point, the outline being a set of one or more lines;
   one or more additional modules implemented at least partially in hardware to determine a manner in which the digital paint is applied to the region based at least in part on the distance value; and
   a display device to display the region with the digital paint applied in the determined manner.

13. The system as described in claim 12, the one or more additional modules including a brush size determination module to dynamically adjust a brush size of a brush used to apply the digital paint, the brush size determination module using smaller brush sizes in response to determining the distance from the location to the nearby point is smaller than in response to determining the distance from the location to the nearby point is larger.

14. The system as described in claim 13, the brush size determination module reducing the brush size in response to determining that additional user selected locations are moving closer to the nearby point, and increasing the brush size in response to determining that the additional user selected locations are moving further from the nearby point.

15. The system as described in claim 12, the one or more additional modules including a brush position determination module to dynamically adjust a position of a brush used to apply the digital paint, the brush position determination module determining that the location is beyond the outline and that a spatial distance between the location and the outline is less than a threshold distance, and in response to determining that the location is beyond the outline and the special distance between the location and the outline is less than the threshold distance, changing a position of the brush to be within the outline and using, as the location, the changed position of the brush.

16. The system as described in claim 12, the one or more additional modules including a fluid paint simulation system that includes a force to cause the digital paint to flow towards the nearby point.

17. The system as described in claim 12, the one or more additional modules including a fluid paint simulation system that includes a force to cause the digital paint to flow along the outline rather than flowing over the outline.

18. In a digital medium painting environment, a system comprising:
   means for receiving a user input selecting a location to apply digital paint to a region of a digital medium, the region being surrounded at least in part by an outline that is a set of one or more lines;
   means for determining a nearby point on the outline that is within a threshold number of pixels of being a closest point spatially on the outline to the location;
   means for obtaining a distance value identifying a spatial distance from the location to the nearby point on the outline;
   means for determining a manner in which the digital paint is applied to the region based at least in part on the distance value; and
   means for displaying the region with the digital paint applied in the determined manner.

19. The system as described in claim 18, the means for determining the manner in which the digital paint is applied to the region comprising means for dynamically adjusting a brush size of a brush used to apply the digital paint, the means for dynamically adjusting comprising using smaller brush sizes in response to determining the distance from the location to the nearby point is smaller than in response to determining the distance from the location to the nearby point is larger.

20. The system as described in claim 18, the means for determining the manner in which the digital paint is applied to the region comprising means for dynamically adjusting a position of a brush used to apply the digital paint, the means for dynamically adjusting comprising positioning the brush within the outline in response to the location being less than a threshold distance beyond the outline, and using the location as the position of the brush in response to the location being at least the threshold distance beyond the outline.

* * * * *